United States Patent
McGhie et al.

(10) Patent No.: US 8,419,032 B1
(45) Date of Patent: Apr. 16, 2013

(54) SUSPENSION SYSTEM FOR A STEERABLE TRAILER

(76) Inventors: James R. McGhie, Henderson, NV (US); Robb I. McGhie, Farmington, MN (US)

(*) Notice: Subject to any disclaimer, the term of this patent is extended or adjusted under 35 U.S.C. 154(b) by 129 days.

(21) Appl. No.: 13/068,324

(22) Filed: May 9, 2011

Related U.S. Application Data

(63) Continuation-in-part of application No. 13/065,670, filed on Mar. 28, 2011, now Pat. No. 8,157,284.

(60) Provisional application No. 61/341,842, filed on Apr. 5, 2010, provisional application No. 61/516,841, filed on Apr. 9, 2011.

(51) Int. Cl.
*B62D 13/04* (2006.01)
*B62D 5/06* (2006.01)
*B62D 53/06* (2006.01)
*B62D 7/06* (2006.01)
*B60G 11/28* (2006.01)

(52) U.S. Cl.
USPC .............. 280/124.157; 280/426; 280/442; 280/100; 280/81.6; 280/423.1

(58) Field of Classification Search .............. 180/24.01, 180/418; 280/426, 442, 443, 444, 100, 81.5, 280/81.6, 423.1, 400, 124.157, 789, 124.111, 280/124.113; 701/41; *B62D 13/00, 13/02, B62D 13/04, 13/06, 61/10, 5/06, 53/06, 63/08, B62D 7/06; B60G 9/02, 11/28*
See application file for complete search history.

(56) References Cited

U.S. PATENT DOCUMENTS

| | | | | | |
|---|---|---|---|---|---|
| 2,818,275 | A | * | 12/1957 | Hollowell | 280/443 |
| 3,454,123 | A | * | 7/1969 | Lewis | 180/23 |
| 3,930,669 | A | * | 1/1976 | Kollander et al. | 280/426 |
| 4,044,854 | A | * | 8/1977 | Schmitt | 180/408 |
| 4,494,766 | A | * | 1/1985 | McHugh et al. | 280/444 |
| 5,183,283 | A | * | 2/1993 | Jarlsson | 280/426 |
| 5,255,754 | A | * | 10/1993 | Lauronen | 180/24.01 |
| 5,492,351 | A | * | 2/1996 | Salo | 280/81.6 |
| 6,059,056 | A | * | 5/2000 | Becker | 180/24.01 |
| 6,131,691 | A | * | 10/2000 | Morch | 180/418 |
| 6,341,251 | B1 | * | 1/2002 | Enomoto et al. | 701/41 |
| 7,216,896 | B1 | * | 5/2007 | McGhie et al. | 280/789 |
| 7,686,320 | B1 | * | 3/2010 | McGhie et al. | 280/442 |
| 2004/0188971 | A1 | * | 9/2004 | Rudder et al. | 280/124.111 |
| 2007/0262552 | A1 | * | 11/2007 | Sutton et al. | 280/124.157 |
| 2008/0048414 | A1 | * | 2/2008 | Van Mill et al. | 280/426 |

FOREIGN PATENT DOCUMENTS

JP 2003312529 A * 11/2003

* cited by examiner

*Primary Examiner* — Faye M Fleming
*Assistant Examiner* — Keith Frisby
(74) *Attorney, Agent, or Firm* — Ted Masters

(57) ABSTRACT

A suspension system for a steerable trailer includes a strut which is mounted to the frame of the trailer, an axle which is connected to the strut, and far and near suspension cylinders which connect the axle to the frame. The far and near suspension cylinders connect to opposite side of the axle. Steering rods connect adjacent axles together, the steering rod connection alternating between the left and right side of the frame.

11 Claims, 6 Drawing Sheets

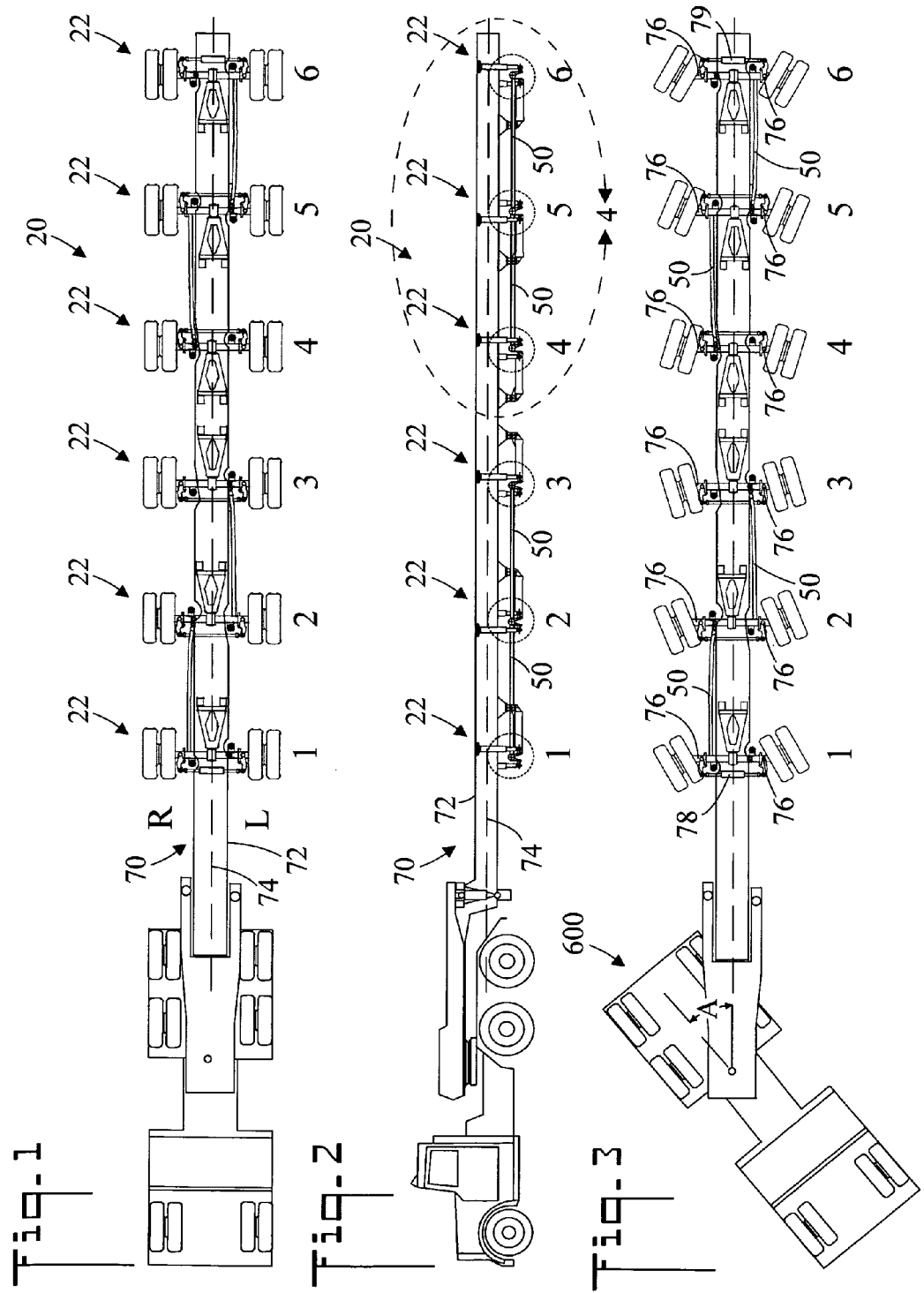

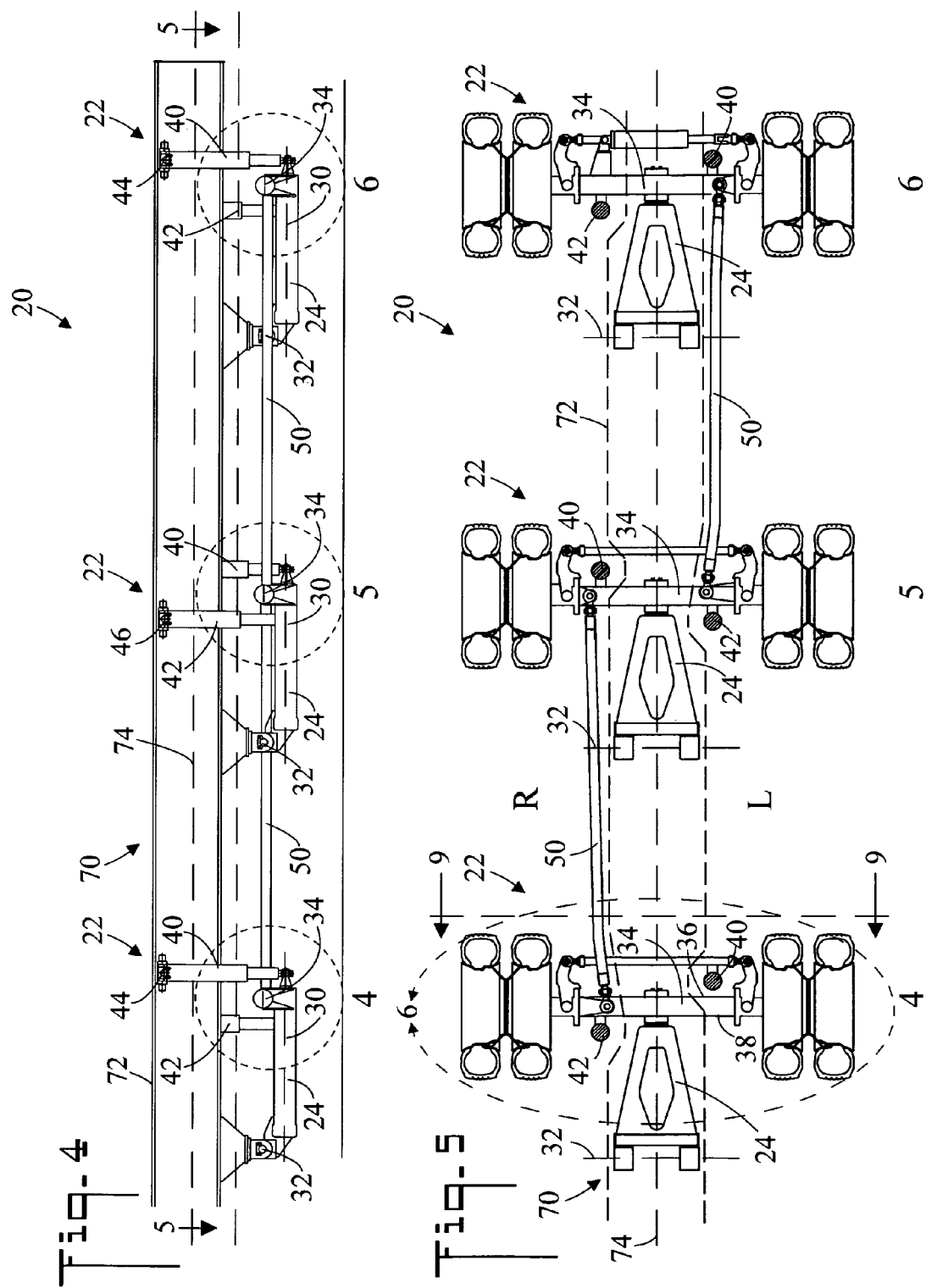

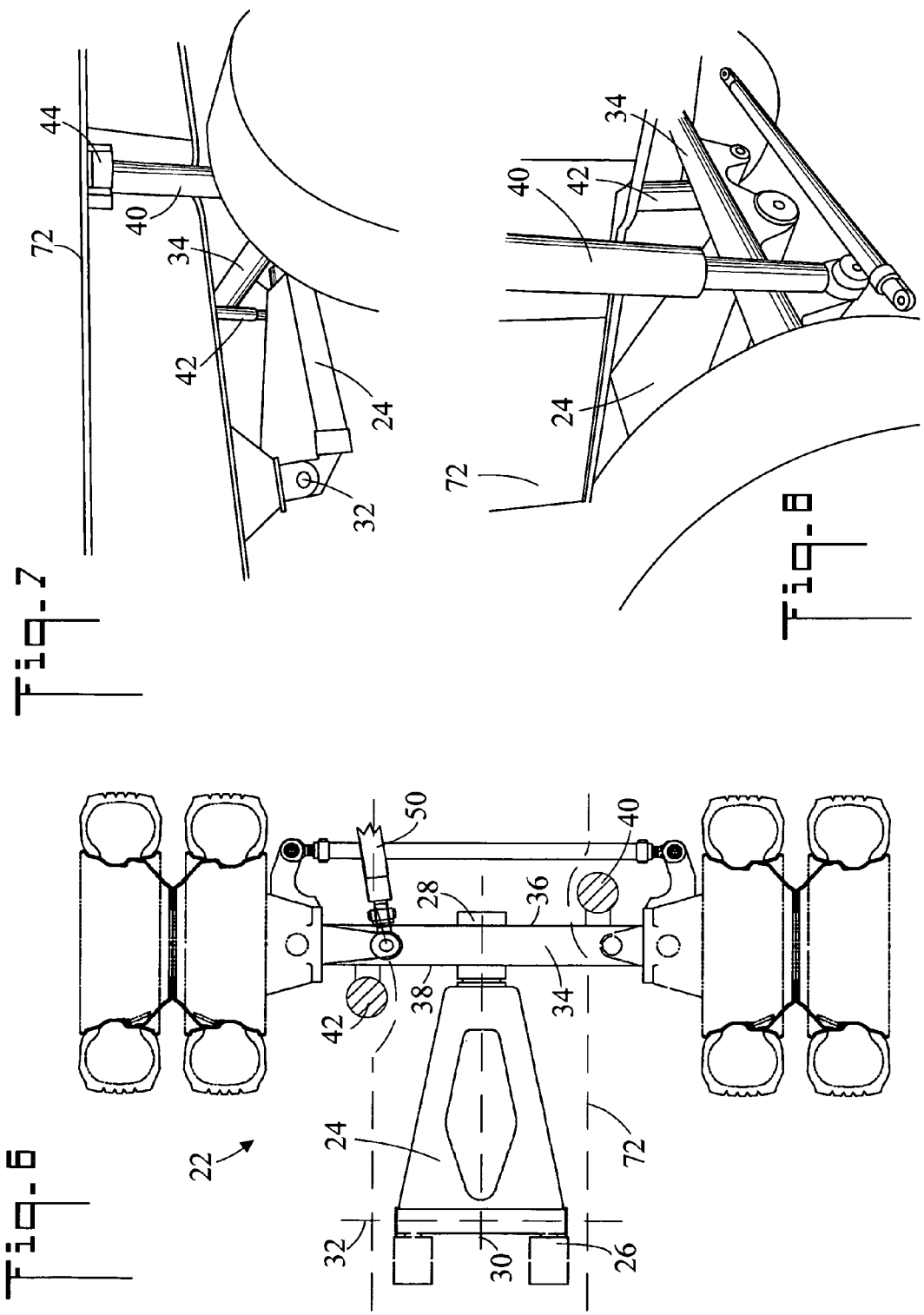

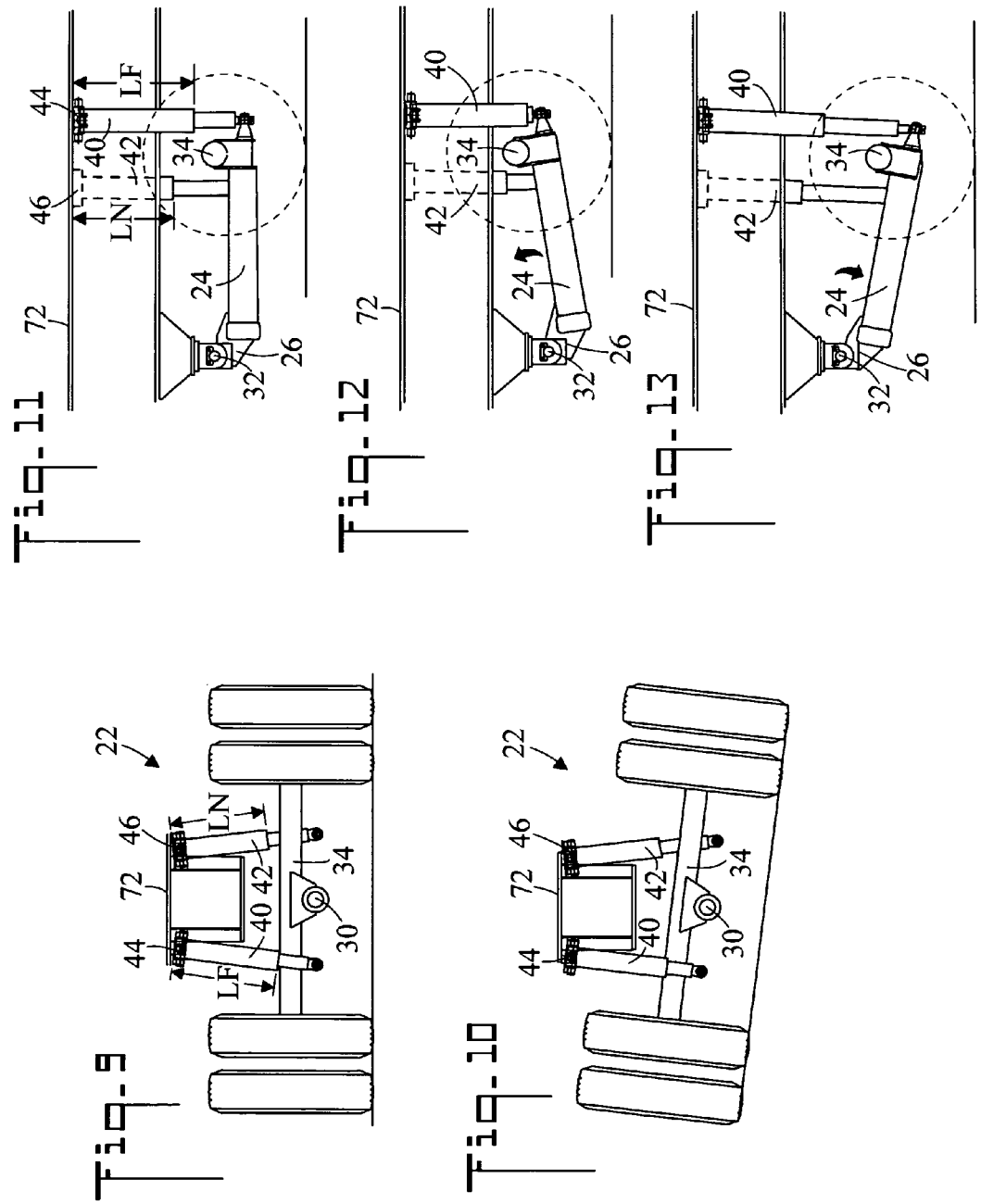

SUSPENSION SYSTEM FOR A STEERABLE TRAILER

CROSS REFERENCE TO RELATED APPLICATION

This application is a Continuation-In-Part of and claims the filing benefit under 35 U.S.C. §120 of application Ser. No. 13/065,670, filed Mar. 28, 2011 now U.S. Pat. No. 8,157,284 which claims the filing benefit under 35 U.S.C. §119(e) of U.S. Provisional Application No. 61/341,842, filed Apr. 5, 2010, both of which previously filed applications are hereby incorporated by reference. This application also claims the filing benefit under 35 U.S.C. §119(e) of U.S. Provisional Application No. 61/516,841, filed Apr. 9, 2011, which is also hereby incorporated by reference.

TECHNICAL FIELD

The present invention pertains generally to transportation, and more particularly to a suspension system for a steerable trailer.

BACKGROUND OF THE INVENTION

Steerable trailers are well known in the art. These vehicles have wheels which turn when the tractor turns. Hydraulic sender cylinders sense the turn of the tractor and transmit this information to receiver cylinders located on one of the trailer axles causing the wheels to turn in proportion to the turn of the tractor. Steering rods connected between axles cause the wheels of other axles to turn accordingly. U.S. Pat. No. 7,686,320 describes such a steering system for a steerable trailer.

The axles of the steerable trailer are connected to the trailer frame by suspension cylinders which serve to raise and lower the frame and to cushion the trailer when it is travelling on a highway. The suspension cylinders are connected to the top of the axles.

BRIEF SUMMARY OF THE INVENTION

The present invention is directed to a suspension system for a steerable trailer which improves trailer performance characteristics, and does so within the North American highway legal width of 8'-6". The present invention utilizes a rotatable strut which is mounted to the frame of the trailer, an axle which is connected to the strut, and two suspension cylinders which are connected between opposite side of the axle to opposite sides of the frame. These features result in a suspension system which has a greater range of vertical travel than that of a conventional suspension system.

In accordance with an embodiment of the suspension system, a steerable trailer has a frame having a longitudinal axis which divides the frame into a left side and an opposite right side. A strut has a first end and an opposite second end and a strut longitudinal axis therebetween. The first end of the strut is rotatably connected to the frame and rotatable about a strut rotation axis which is perpendicular to the longitudinal axis of the frame. An axle is rotatably connected to the second end of the strut as is rotatable about the said strut longitudinal axis. The axle has a far side and a near side, the near side is disposed between the far side and the strut rotation axis. A far suspension cylinder is connected between the frame and the far side of the axle, and is disposed on one of the left side and the right side of the frame. A near suspension cylinder is connected between the frame and the near side of the axle and is disposed on the other (opposite) of the left side and the right side of the frame from the far suspension cylinder.

In accordance with another embodiment, the far suspension cylinder has a first length; and the near suspension cylinder has a second length which is shorter than the first length of the far suspension cylinder.

In accordance with another embodiment, a conventional suspension cylinder has a third length which is shorter than both the first length and the second length.

In accordance with another embodiment, a far universal joint connects the frame and the far suspension cylinder, and a near universal joint connects the frame and the near suspension cylinder. The far and near universal joints each include a bore which accepts the far suspension cylinder and said near suspension cylinder respectively.

In accordance with another embodiment, the connection of the far suspension cylinder to the axle is below the axle, and the connection of the near suspension cylinder to the axle g below the axle.

In accordance with another embodiment, the strut, the axle, the far suspension cylinder, and the near suspension cylinder form a suspension system group. A plurality of suspension system groups are disposed in spaced apart relationship along the frame. For adjacent suspension system groups the connection of the far suspension cylinder and the near suspension cylinder to the axle is reversed from the left side of the frame to the right side of the frame.

In accordance with another embodiment, a steering rod is connected between the axles of two adjacent suspension system groups, the steering rod is oriented substantially parallel to the longitudinal axis of the frame. The steering rod is connected to the axles on an opposite side of the axle from the connection of the far suspension cylinder or the near suspension cylinder.

In accordance with another embodiment, the steering rod location alternates between the left side of the frame and the right side of the frame.

In accordance with another embodiment, the strut, the axle, the far suspension cylinder, and the near suspension cylinder combine to form a first suspension system group. A second strut, a second axle, a second far suspension cylinder, and a second near suspension cylinder combine to form a second suspension system group, the second suspension system group disposed in adjacent spaced apart relationship with the first suspension system group along the longitudinal axis of the trailer. The second near suspension cylinder of the second suspension system group being disposed on an opposite side of the frame from the near suspension cylinder of the first suspension system group.

Other possible embodiments, in addition to the possible embodiments enumerated above, will become apparent from the following detailed description, taken in conjunction with the accompanying drawings, which illustrate, by way of example, the principles of the suspension system.

BRIEF DESCRIPTION OF THE DRAWINGS

FIG. 1 is a top plan view of a suspension system for a steerable trailer;

FIG. 2 is a side elevation view of the suspension system;

FIG. 3 is a top plan view of the suspension system with the steerable trailer in a turn;

FIG. 4 is an enlarged side elevation view of area 4 of FIG. 2;

FIG. 5 is a cross sectional view along the line 5-5 of FIG. 4;

FIG. 6 is an enlarged view of area 6 of FIG. 5;

FIG. 7 is an enlarged fragmented front perspective view of the suspension system of one axle;

FIG. 8 is and enlarged fragmented rear perspective view of the suspension system of one axle;

FIG. 9 is a view along the line 9-9 of FIG. 5;

FIG. 10 is a view as in FIG. 9 with the axle rolled to one side;

FIG. 11 is an enlarged side elevation view of the suspension system of one axle with the system in a middle position;

FIG. 12 is an enlarged side elevation view of the suspension system of one axle with the system in a raised position;

FIG. 13 is an enlarged side elevation view of the suspension system of one axle with the system in a lowered position;

DETAILED DESCRIPTION OF THE INVENTION

Figure 15:
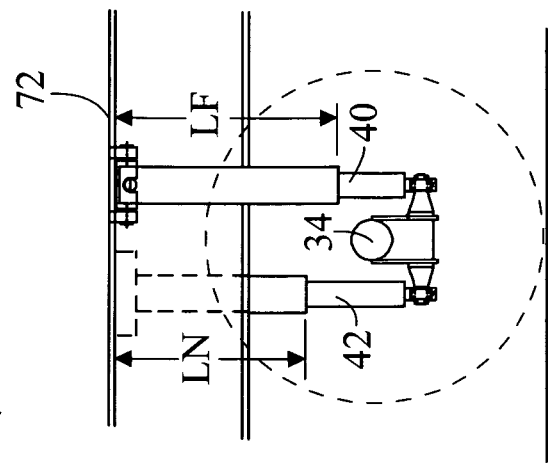
FIG. 15 is an enlarged side elevation view of the suspension system of the present invention.

Referring initially to FIGS. 1-2, there are illustrated top plan and side elevation views respectively of a suspension system for a steerable trailer 70, the system generally designated as 20. Steerable trailer 70 has a elongated frame 72 having a longitudinal axis 74 which divides frame 72 into a left side (L) and an opposite right side (R). In the shown embodiment, steerable trailer 70 includes six axles labeled 1-6, however other numbers of axles are also possible. Also in the shown embodiment suspension system 20 comprises two independent axle groups, one for axles 1-3 and another for axles 4-6. That is, axles 1-3 are mechanically connected together, and axles 4-6 are mechanically connected together. As is described below, suspension system 20 includes a plurality of suspension system groups 22, one group for each of the axles of steerable trailer 70.

FIG. 3 is a top plan view of suspension system 20 with steerable trailer 70 in a turn. As is well known in the art, the steering angle A between tractor 600 and steerable trailer 70 is sensed and an hydraulic steering system causes the left and right wheel assemblies 76 of axles 1 and 6 to turn. Receiver cylinders 78 and 79 cause the wheel 76 assemblies of axles 1 and 6 to turn respectively. Steering rods 76 connected between axles cause the wheel assemblies 76 of axles 2 and 3 to turn in proportion to the wheel assemblies 76 of axle 1, and the wheel assemblies 76 of axles 5 and 4 to turn in proportion to the wheel assemblies 76 of axle 6.

FIG. 4 is an enlarged side elevation view of area 4 of FIG. 2, FIG. 5 is a cross sectional view along the line 5-5 of FIG. 4, and FIG. 6 is an enlarged view of area 6 of FIG. 5. Each suspension system group 22 of suspension system 20 includes a strut 24 which has a first end 26 and an opposite second end 28 and a strut longitudinal axis 30 therebetween. First end 26 of strut 24 is rotatably connected to frame 72 (shown in broken lines in FIGS. 5 and 6) and is rotatable about a strut rotation axis 32 which is perpendicular to longitudinal axis 74 of frame 72 (also refer to FIGS. 11-13). It is noted that longitudinal axis 74 of frame 72 and strut rotation axis 32 do not intersect, however strut rotation axis 32 is perpendicular to longitudinal axis 74 of frame 72 when view from above as in FIG. 5. The rotation of strut 24 about strut rotation axis 32 is depicted in FIGS. 11-13. In FIG. 4 and elsewhere the tires of wheel assemblies 76 are shown in broken lines.

Suspension system 20 further includes an axle 34 which is rotatably connected to second end 28 of strut 24. Axle 34 is rotatable about strut longitudinal axis 30 (refer also to FIG. 10). As is best seen in FIG. 6, axle 34 has a far side 36 and a near side 38, wherein near side 38 is disposed between far side 36 and strut rotation axis 32, the reference point being strut rotation axis 32. That is, far side 36 is further away from strut rotation axis 32 than is near side 38. Suspension system 20 also includes a far suspension cylinder 40 which is connected between frame 72 and far side 36 of axle 34. Far suspension cylinder 40 is disposed on one of the left side L and right side R of frame 72. A near suspension cylinder 42 is connected between frame 72 and near side 38 of axle 34. Near suspension cylinder 42 is disposed on the other of left side L and right side R of frame 72 from far suspension cylinder 40. That is, far suspension cylinder 40 and near suspension cylinder 42 are both on opposites sides of frame 72 and on opposite sides of axle 34 from each other. Also referring to FIGS. 9 and 11, a far universal joint 44 connects frame 72 and far suspension cylinder 40, and a near universal joint 46 connects frame 72 and near suspension cylinder 42 (also refer to FIGS. 16-18 and the associated discussion). Also referring to FIG. 9, it is noted that the connection of far suspension cylinder 40 to axle 34 is below axle 34, the connection of near suspension cylinder 42 to axle 34 is below axle 34 (also refer to FIGS. 14-15 and the associated discussions). As used herein, axle 34 includes the straight axle tube and the left and right rotatable wheel assemblies 76. Suspension cylinders 40 and 42 are also known as shock absorbers, and consist of a cylindrical tube containing hydraulic fluid in which a rod with piston travels.

Also referring to FIGS. 9 and 11, far suspension cylinder 40 has a first length LF, and near suspension cylinder 42 has a second length LN which is shorter than first length LF of far suspension cylinder 40. It is noted that the length of far suspension cylinder 40 must be longer than that of near suspension cylinder 42 because far suspension cylinder 40 is mounted further from strut rotation axis 32.

Referring to FIGS. 1, 2, 4 and 5, strut 24, axle 34, far suspension cylinder 40, and near suspension cylinder 42 form a suspension system group 22. Suspension system 20 includes a plurality of suspension system groups 22 disposed in spaced apart relationship along frame 72. In FIGS. 1 and 2 is noted that suspension system 20 contains six suspension system groups 22 which are further partitioned into two axle groups (axles 1-3 and axles 4-6). For adjacent suspension system groups 22 the connection of far suspension cylinder 40 and near suspension cylinder 42 to axle 34 is reversed from left side L of frame 72 to right side R of frame 72. For example for suspension system group 22 of axle 4, far suspension cylinder 40 is on left side L of frame 72 and near suspension cylinder 42 is on right side R of frame 72. For axle 5, the locations are reversed wherein far suspension cylinder 40 is on right side R of frame 72 and near suspension cylinder 42 is on left side L of frame 72. The respective locations of suspension cylinders 40 and 42 again reverse for axle 6 which is the same as for axle 4.

Put a different way, strut 24, axle 34, far suspension cylinder 40, and near suspension cylinder 42 combine to form a first suspension system group 22 (e.g. for axle 4). A second strut 24, a second axle 34, a second far suspension cylinder 40, and a second near suspension cylinder 42 combine to form a second suspension system group 22 (e.g for axle 5). The second suspension system group 22 is disposed in adjacent spaced apart relationship with first suspension system group along longitudinal axis 74 of trailer 70. Near suspension cylinder 42 of the second suspension system group 22 (e.g. for axle 5) is disposed on an opposite side of frame 72 from near suspension cylinder 42 of first suspension system group 22 (e.g. for axle 4).

Referring again to FIGS. 4, 5, and 6, a steering rod 50 is connected between axles 34 of two adjacent suspension system groups 22. Steering rod 50 is oriented substantially parallel to longitudinal axis 74 of frame 72. Steering rod 50 is connected to axles 34 on an opposite side of axles 34 from the connection of far suspension cylinder 40 or near suspension cylinder 42. Connecting steering rod 50 to the opposite side of axle 34 ensures that there will be no mechanical interference between steering rod 50 and the suspension cylinders. For example, in FIGS. 5 and 6 it is noted that for axle 4 steering rod 50 is connected to the far side 36 of axle 34 while near suspension cylinder 42 is connected to the near side 38 of axle 34. And, for axle 5 steering rod 50 is connected to the near side 38 of axle 34, while far suspension cylinder 40 is connected to the far side 35 of axle 34. As such, steering rod 50 cannot interfere with the suspension cylinders. Put another way, the location of steering rods 50 alternate between left side L and right side R of frame 72. This alternating location is necessary because of the alternating placement of far suspension cylinder 40 and near suspension cyhlinder 42.

Referring to FIGS. 1, 2, 4, and 5, suspension system 20 for a multiple axle trailer includes a steerable trailer 70 having a frame 72 having a longitudinal axis 74 which divides frame 72 into a left side L and an opposite right side R. A first suspension system group 22 includes (1) a first strut 24 connected to frame 72, (2) a first axle 34 connected to first strut 24, first axle 34 having a far side 36 and an opposite near side 38, (3) a first far suspension cylinder 40 connected to far side 36 of first axle 34, and (4) a first near suspension cylinder 42 connected to near side 38 of first axle 34, first far suspension cylinder 40 connected to one of left side L and right side R of frame 72, and near suspension cylinder 38 connected to the other of left side L and right side R of frame 72. A second suspension system group 22 includes (1) a second strut 24 connected to frame 72, (2) a second axle 34 connected to second strut 24, second axle 34 having a far side 36 and an opposite near side 38, (3) a second far suspension cylinder 40 connected to far side 36 of second axle 34, and (4) a second near suspension cylinder 42 connected to near side 38 of second axle 34, second far suspension cylinder 40 connected to an opposite side of frame 72 from first far suspension cylinder 40, and second near suspension cylinder 42 connected to an opposite side of frame 72 from first near suspension cylinder 42. A third suspension system group 22 includes (1) a third strut 34 connected to frame 72, (2) a third axle 34 connected to third strut 24, third axle 34 having a far side 36 and an opposite near side 38, (3) a third far suspension cylinder 40 connected to far side 36 of third axle 34, and (4) a third near suspension cylinder 42 connected to near side 38 of third axle 34, third far suspension cylinder 40 connected to a same side of frame 72 as first far suspension cylinder 40, and third near suspension cylinder 42 connected to a same side of frame 72 as first near suspension cylinder 40. In the foregoing discussion, it may be appreciated that the first suspension system group 22 may include axle 1 or axle 4, the second suspension system group 22 may include axle 2 or axle 5, and the third suspension system group 22 may include axle 3 or axle 6.

A first steering rod 50 is connected between first axle 34 and second axle 34. A second steering rod 50 is connected between second axle 34 and third axle 34. First steering rod 50 and said second steering rod 50 are disposed on opposites sides of frame 72.

It is noted that strut 24 provides some very useful properties in suspension system 20. Strut 24 takes fore and aft forces, side to side forces and interacts with the axle 34. Strut 24 is connected to the underside of axle 34 and allows for side to side movement. Axle 34 pivots on the strut 24 about strut longitudinal axis 30 (refer to FIG. 10). The strut 24/axle 34 pair provides the following:

(1) allows vertical movement and side oscillation (oscillation force is horizontal due to underside pivot on axle 34).
(2) equalizes torsion from suspension cylinders 40 and 42 along axle 34
(3) takes side to side force from axle 34
(4) takes longitudinal forces from braking, highway resistance, etc.
(5) takes rotational forces from axle steer (mechanical part of suspension)

FIGS. 7 and 8 are enlarged fragmented front perspective and rear perspective views respectively of suspension system 20 of one axle of steerable trailer 70 showing frame 72, strut 24, axle 34, far suspension cylinder 40, and near suspension cylinder 42.

FIG. 9 is a view along the line 9-9 of FIG. 5, and FIG. 10 is a view as in FIG. 9 with axle 34 rolled to one side. Shown are strut longitudinal axis 30, far suspension cylinder 40 having a length LF, near suspension cylinder 42 having a length LN, far universal joint 44, and near universal joint 46.

FIGS. 11-13 are enlarged side elevation views of the suspension system of one axle with the system in middle position, raised, and lowered positions respectively. The hydraulic system of steerable trailer 70 can raise and lower frame 72. Shown are strut 24, strut rotation axis 32, axle 34, far suspension cylinder 40 of length LF, near suspension cylinder 42 of length LN, far universal joint 44, and near universal joint 46. The lowered position of FIG. 12 is typically used to load steerable trailer 70 with cargo. The middle position of FIG. 11 is typically used when steerable trailer 70 is traveling on a highway.

Figure 14:
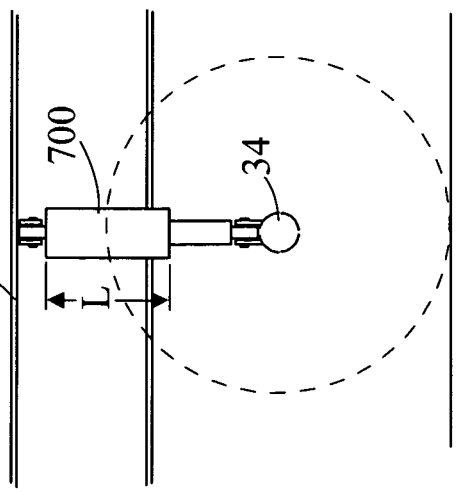
FIG. 14 is an enlarged side elevation view of a prior art suspension system.

FIG. 14 is an enlarged side elevation view of a prior art conventional suspension system. Conventional suspension cylinder 700 has a third length L and is connected between frame 72 and the top of axle 34. Because suspension cylinder 700 is connected to the top of axle 34, its length is limited.

FIG. 15 is an enlarged side elevation view of suspension system 20. Since far suspension cylinder 40 and near suspension cylinder 42 are both connected to axle 34 below axle 34, both first length LF of far suspension cylinder 40 and second length LN of near suspension cylinder 42 can be longer than third length L of conventional suspension cylinder 700 (refer to FIG. 14). That is, third length L is shorter than both first length LF and second length LN. The longer suspension cylinders of the present invention are advantageous because (1) they provide an increase range of raising and lowering, and (2) they provide better cushioning over rough or undulating roads.

Figure 18:
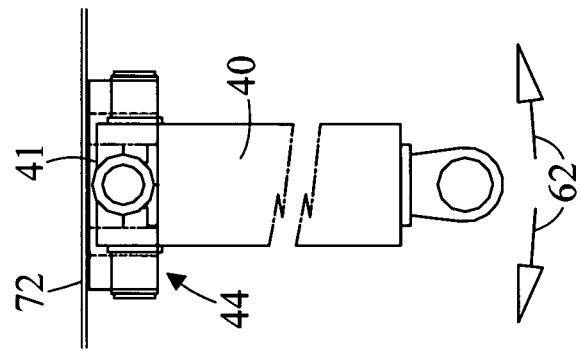
Figure 16:
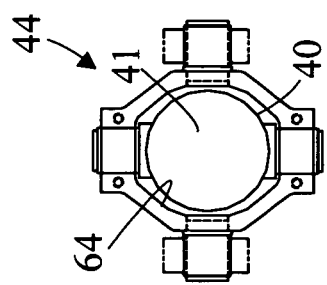
FIG. 16 is an enlarged top plan view of a universal joint connected to a suspension cylinder.
Figure 17:
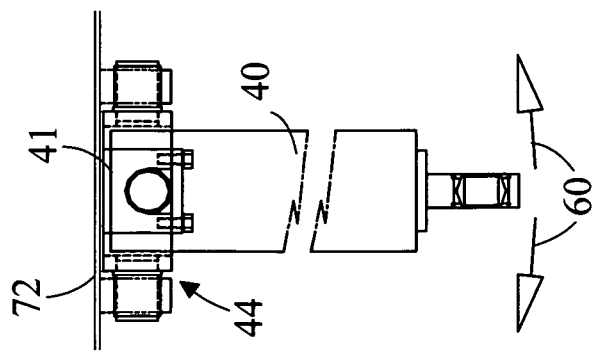
FIG. 17 is an enlarged side elevation view of the universal joint and suspension cylinder; and, FIG. 18 is an enlarged rotated side elevation view of the universal joint and suspension cylinder.

FIGS. 16-18 are enlarged top plan, side elevation, and rotated side elevation views respectively of far universal joint 44 connected to far suspension cylinder 40. Far universal joint 44 provides rotation in a first axis 60 and a second axis 62 perpendicular to first axis 60. Far universal joint 44 also includes a bore 64 which accepts the upper body of far suspension cylinder 40. That is, the upper body of far suspension cylinder 40 fits into bore 64 of first universal joint 44 so that the top 41 of far suspension cylinder 40 is almost flush with the top of far universal joint 44. This feature allows far suspension cylinder 40 to be mounted closer to frame 72, thereby permitting a longer cylinder to be installed, with the resulting advantage of better cushioning over road undulations. It may be appreciated that FIGS. 16-18 also apply to the connection of near universal joint 46 to near suspension cylinder 42.

The possible embodiments of the suspension system described herein are exemplary and numerous modifications, combinations, variations, and rearrangements can be readily envisioned to achieve an equivalent result, all of which are intended to be embraced within the scope of the appended claims. Further, nothing in the above-provided discussions and drawings of the suspension system should be construed as limiting the invention to a particular embodiment or combination of embodiments. The scope of the invention is best defined by the appended claims.

We claim:

1. A suspension system for a steerable trailer, comprising:
    a steerable trailer having a frame having a longitudinal axis, said longitudinal axis dividing said frame into a left side and an opposite right side;
    a strut having a first end and an opposite second end and a strut longitudinal axis therebetween, said first end of said strut rotatably connected to said frame and rotatable about a strut rotation axis which is perpendicular to said longitudinal axis of said frame;
    an axle rotatably connected to said second end of said strut, said axle rotatable about said strut longitudinal axis;
    said axle having a far side and a near side, said near side disposed between said far side and said strut rotation axis;
    a far suspension cylinder connected between said frame and said far side of said axle, said far suspension cylinder disposed on one of said left side and said right side of said frame; and,
    a near suspension cylinder connected between said frame and said near side of said axle, said near suspension cylinder disposed on the other of said left side and said right side of said frame from said far suspension cylinder.

2. The suspension system according to claim 1, further including:
    said far suspension cylinder having a first length; and,
    said near suspension cylinder having a second length which is shorter than said first length of said far suspension cylinder.

3. The suspension system according to claim 1, further including:
    a far universal joint connecting said frame and said far suspension cylinder, and a near universal joint connecting said frame and said near suspension cylinder; and,
    said far and near universal joints each including a bore which accepts said far suspension cylinder and said near suspension cylinder respectively.

4. The suspension system according to claim 1, further including:
    said connection of said far suspension cylinder to said axle being below said axle, and said connection of said near suspension cylinder to said axle being below said axle.

5. The suspension system according to claim 1, further including:
    said strut, said axle, said far suspension cylinder, and said near suspension cylinder forming a suspension system group;
    a plurality of said suspension system groups disposed in spaced apart relationship along said frame; and,
    for adjacent said suspension system groups said connection of said far suspension cylinder and said near suspension cylinder to said axle being reversed from said left side of said frame to said right side of said frame.

6. The suspension system according to claim 5, further including:
    a steering rod connected between said axles of two said adjacent suspension system groups, said steering rod oriented substantially parallel to said longitudinal axis of said frame, and,
    said steering rod connected to said axles on an opposite side of said axle from said connection of said far suspension cylinder or said near suspension cylinder.

7. The suspension system according to claim 5, further including:
    a first suspension system group having a first axle, said first suspension system group adjacent to and spaced apart from a second suspension system group having a second axle;
    a first steering rod connected between said first axle and said second axle, said first steering rod oriented substantially parallel to said longitudinal axis of said frame, and said first steering rod located on one of said left side of said frame and said right side of said frame;
    a third suspension system group having a third axle, said third suspension system group adjacent to and spaced apart from said second suspension system group, said third suspension system group disposed on an opposite side of said second suspension system group from said first suspension system group; and,
    a second steering rod connected between said second axle and said third axle, said second steering rod oriented substantially parallel to said longitudinal axis of said frame, and said second steering rod located on the other of said left side of said frame and said right side of said frame.

8. The suspension system according to claim 1, further including:
    said strut, said axle, said far suspension cylinder, and said near suspension cylinder combining to form a first suspension system group;
    a second strut, a second axle, a second far suspension cylinder, and a second near suspension cylinder combining to form a second suspension system group, said second suspension system group disposed in adjacent spaced apart relationship with said first suspension system group along said longitudinal axis of said trailer; and,
    said second near suspension cylinder of said second suspension system group being disposed on an opposite side of said frame from said near suspension cylinder of said first suspension system group.

9. The suspension system according to claim 1, further including:
    said far suspension cylinder having a first length;
    said near suspension cylinder having a second length which is shorter than said first length of said far suspension cylinder;
    a far universal joint connecting said frame and said far suspension cylinder, and a near universal joint connecting said frame and said near suspension cylinder, said far and near universal joints each including a bore which accepts said far suspension cylinder and said near suspension cylinder respectively;
    said connection of said far suspension cylinder to said axle being below said axle, and said connection of said near suspension cylinder to said axle being below said axle;
    said strut, said axle, said far suspension cylinder, and said near suspension cylinder forming a suspension system group;

a plurality of said suspension system groups disposed in spaced apart relationship along said frame;

for adjacent said suspension system groups said connection of said far suspension cylinder and said near suspension cylinder to said axle being reversed from said left side of said frame to said right side of said frame;

a steering rod connected between said axles of two said adjacent suspension system groups, said steering rod oriented substantially parallel to said longitudinal axis of said frame, said steering rod connected to said axles on an opposite side of said axle from said connection of said far suspension cylinder or said near suspension cylinder;

a first suspension system group having a first axle, said first suspension system group adjacent to and spaced apart from a second suspension system group having a second axle;

a first steering rod connected between said first axle and said second axle, said first steering rod oriented substantially parallel to said longitudinal axis of said frame, and said first steering rod located on one of said left side of said frame and said right side of said frame;

a third suspension system group having a third axle, said third suspension system group adjacent to and spaced apart from said second suspension system group, said third suspension system group disposed on an opposite side of said second suspension system group from said first suspension system group; and, a second steering rod connected between said second axle and said third axle, said second steering rod oriented substantially parallel to said longitudinal axis of said frame, and said second steering rod located on the other of said left side of said frame and said right side of said frame.

10. A suspension system for a steerable trailer, comprising:

a steerable trailer having a frame having a longitudinal axis, said longitudinal axis dividing said frame into a left side and an opposite right side;

a first suspension system group including (1) a first strut connected to said frame, (2) a first axle connected to said first strut, said first axle having a far side and an opposite near side, (3) a first far suspension cylinder connected to said far side of said first axle, and (4) a first near suspension cylinder connected to said near side of said first axle, said first far suspension cylinder connected to one of said left side and said right side of said frame, and said near suspension cylinder connected to the other of said left side and said right side of said frame;

a second suspension system group including (1) a second strut connected to said frame, (2) a second axle connected to said second strut, said second axle having a far side and an opposite near side, (3) a second far suspension cylinder connected to said far side of said second axle, and (4) a second near suspension cylinder connected to said near side of said second axle, said second far suspension cylinder connected to an opposite side of said frame from said first far suspension cylinder, and said second near suspension cylinder connected to an opposite side of said frame from said first near suspension cylinder; and, a third suspension system group including (1) a third strut connected to said frame, (2) a third axle connected to said third strut, said third axle having a far side and an opposite near side, (3) a third far suspension cylinder connected to said far side of said third axle, and (4) a third near suspension cylinder connected to said near side of said third axle, said third far suspension cylinder connected to a same side of said frame as said first far suspension cylinder, and said third near suspension cylinder connected to a same side of said frame as said first near suspension cylinder.

11. The suspension system according to claim 10, further including:

a first steering rod connected between said first axle and said second axle;

a second steering rod connected between said second axle and said third axle, and, said first steering rod and said second steering rod disposed on opposites sides of said frame.

\* \* \* \* \*